(12) United States Patent
Nasu et al.

(10) Patent No.: US 11,329,846 B2
(45) Date of Patent: May 10, 2022

(54) DATA PROCESSING DEVICE AND DATA PROCESSING SYSTEM

(71) Applicant: Mitsubishi Electric Corporation, Tokyo (JP)

(72) Inventors: Osamu Nasu, Tokyo (JP); Yusuke Matsushita, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/298,948

(22) PCT Filed: Feb. 14, 2019

(86) PCT No.: PCT/JP2019/005282
§ 371 (c)(1),
(2) Date: Jun. 2, 2021

(87) PCT Pub. No.: WO2020/165994
PCT Pub. Date: Aug. 20, 2020

(65) Prior Publication Data
US 2021/0359881 A1    Nov. 18, 2021

(51) Int. Cl.
*H04L 12/66* (2006.01)
*H04L 29/08* (2006.01)
*H04L 67/10* (2022.01)

(52) U.S. Cl.
CPC .............. *H04L 12/66* (2013.01); *H04L 67/10* (2013.01)

(58) Field of Classification Search
CPC .......................... H04L 12/66; H04L 67/10
See application file for complete search history.

(56) References Cited

U.S. PATENT DOCUMENTS

2008/0077657 A1    3/2008  Tagami et al.
2013/0212214 A1*   8/2013  Lawson ................ H04L 43/045
                                              709/217

(Continued)

FOREIGN PATENT DOCUMENTS

JP    2001-265821 A    9/2001
JP    2003-233417 A    8/2003

(Continued)

OTHER PUBLICATIONS

International Search Report and Written Opinion dated Apr. 23, 2019, received for PCT Application PCT/JP2019/005282, Filed on Feb. 14, 2019, 7 pages including English Translation.

(Continued)

*Primary Examiner* — Jamal Javaid
*Assistant Examiner* — Thad N Defauw
(74) *Attorney, Agent, or Firm* — Xsensus LLP

(57) ABSTRACT

An edge system (100) transfers data to a cloud server (400). A flow controller (140) controls dataflow that is a flow of data processing in the edge system (100) of data collected from equipment. A gateway communicator (170) communicates with the cloud server (400) in compliance with a specification of an external interface that is publicly-released and defined with respect to receiving and sending of data from and to the cloud server (400). A gateway connector (180) connects the flow controller (140) to the gateway communicator (170) to enable communication between the gateway communicator (170) and the flow controller (140). The gateway communicator (170) communicates with the gateway connector (180) in compliance with a specification of an internal interface that is publicly-released and defined with respect to receiving and sending of data in the data processing system.

9 Claims, 11 Drawing Sheets

(56) References Cited

U.S. PATENT DOCUMENTS

2017/0187597 A1\* 6/2017 Nolan ..................... H04L 67/12
2019/0149614 A1\* 5/2019 Shibamoto ............ H04L 67/141
   709/227

FOREIGN PATENT DOCUMENTS

| JP | 2004-165868 A | 6/2004 | | |
|----|---------------|--------|---|---|
| JP | 2008-27189 A | 2/2008 | | |
| JP | 2013-30163 A | 2/2013 | | |
| WO | 2017/002222 A1 | 1/2017 | | |
| WO | 2017/130275 A1 | 8/2017 | | |
| WO | WO-2018209195 A1 \* | 11/2018 | ............. | G06F 9/542 |

OTHER PUBLICATIONS

Decision to Grant dated Jul. 7, 2020, received for JP Application 2020-519159, 5 pages including English Translation.

Chinese Office Action dated Feb. 9, 2022, in Chinese Patent Application No. 201980091581.5, 17 pp.

\* cited by examiner

DATA PROCESSING DEVICE AND DATA PROCESSING SYSTEM

CROSS-REFERENCE TO RELATED APPLICATION

The present application is based on PCT filing PCT/JP2019/005282, filed Feb. 14, 2019, the entire contents of which are incorporated herein by reference.

TECHNICAL FIELD

The present disclosure relates to a data processing device and a data processing system.

BACKGROUND ART

In a monitoring system described in Patent Literature 1, a programmable logic controller (PLC) transmits, to a monitoring device, data collected through a communication network. Since the PLC has its own communication specification and command system, a relay device is disposed between the PLC and a connection device for connecting the PLC to the communication network. This relay device performs relaying between the PLC and the connection device.

The relay device is to support different connection devices for different communication network types, and thus has a rewritable parameter block with defined parameters for connection procedures. In a case of change of the communication network to be used, the parameter block of the relay device is rewritten to have parameters for connection procedures corresponding to a new communication network. In this way, the relay device can be adapted to the connection procedures corresponding to the connection device to be newly connected.

CITATION LIST

Patent Literature

Patent Literature 1: Unexamined Japanese Patent Application Publication No. 2004-165868

SUMMARY OF INVENTION

Technical Problem

Patent Literature 1 discloses a technique of accommodating a difference in types of networks, but in a case where two or more systems communicate via a network, accommodation is to be made not only for the difference in types of the networks but also a difference in system-unique interfaces. For example, in the field of factory automation (FA), a data processing system using edge computing may coordinate with external services such as cloud computing services. In this case, the data processing system is to accommodate not only a difference in communication networks for connection to a cloud server but also an interface unique to the cloud computing service to be the subject of coordination. This is because each cloud computing service has its own interface.

Since the relay device described in Patent Literature 1 can only accommodate the difference in types of the networks, a user of the data processing system, for example, provides an intermediate server between a server for providing the cloud computing service and the data processing system to adapt to the interface unique to the cloud computing service. This intermediate server operates, adapting to the interface of the cloud computing service and the interface of the data processing system. The intermediate server performing relaying between the cloud computing service and the data processing system enables the data processing system to coordinate with the cloud computing service.

In this way, the user of the data processing system needs to build the intermediate server, while conscious of the interface of the cloud computing service that the data processing system uses. In addition, in a case where the interface of the cloud computing service is changed or the user of the data processing system changes a service to use, the user needs to change a configuration of the intermediate server, so that development becomes overburdened. In this way, the user of the data processing system is to provide an intermediate server or another relaying means, while conscious of the interface of the service on the cloud side, and a method for providing the intermediate server or another relaying means is not easy for the user to use.

In view of the above circumstances, an objective of the present disclosure is to enable seamless coordination between a data processing system and an external service without a user of the data processing system being conscious of an interface of the external service.

Solution to Problem

In order to achieve the above objective, the data processing device according to the present disclosure transfers data to an external service to achieve coordination between the data processing system and the external service. Flow control means controls dataflow that is a data processing flow in the data processing system of data collected from equipment. Gateway communication means communicates with the external service in compliance with a specification of an external interface that is publicly-released and defined with respect to receiving and sending of data from and to the external service. A gateway connection means connects the flow control means and the gateway communication means to enable communication between the gateway communication means and the flow control means. The gateway communication means communicates with the gateway connection means in compliance with a specification of an internal interface that is publicly-released and defined with respect to receiving and sending of data in the data processing system.

Advantageous Effects of Invention

In the data processing device according to the present disclosure, to transfer data to an external service, gateway communication means communicates with the external service in compliance with a specification of the external interface that is publicly-released and defined with respect to receiving and sending of data from and to the external service. Gateway connection means connects the flow control means and the gateway communication means to enable communication between the gateway communication means and the flow control means for controlling dataflow in the data processing system. The gateway communication means communicates with the gateway connection means in compliance with a specification of an internal interface that is publicly-released and defined with respect to receiving and sending of data in the data processing system. With such a configuration, seamless coordination between the data processing system and the external service is enabled without a user of the data processing system being conscious of the interface of the external service.

DESCRIPTION OF EMBODIMENTS

Embodiment

A data coordination system according to an embodiment of the present disclosure is hereinafter described in detail with reference to the drawings.

Figure 1:
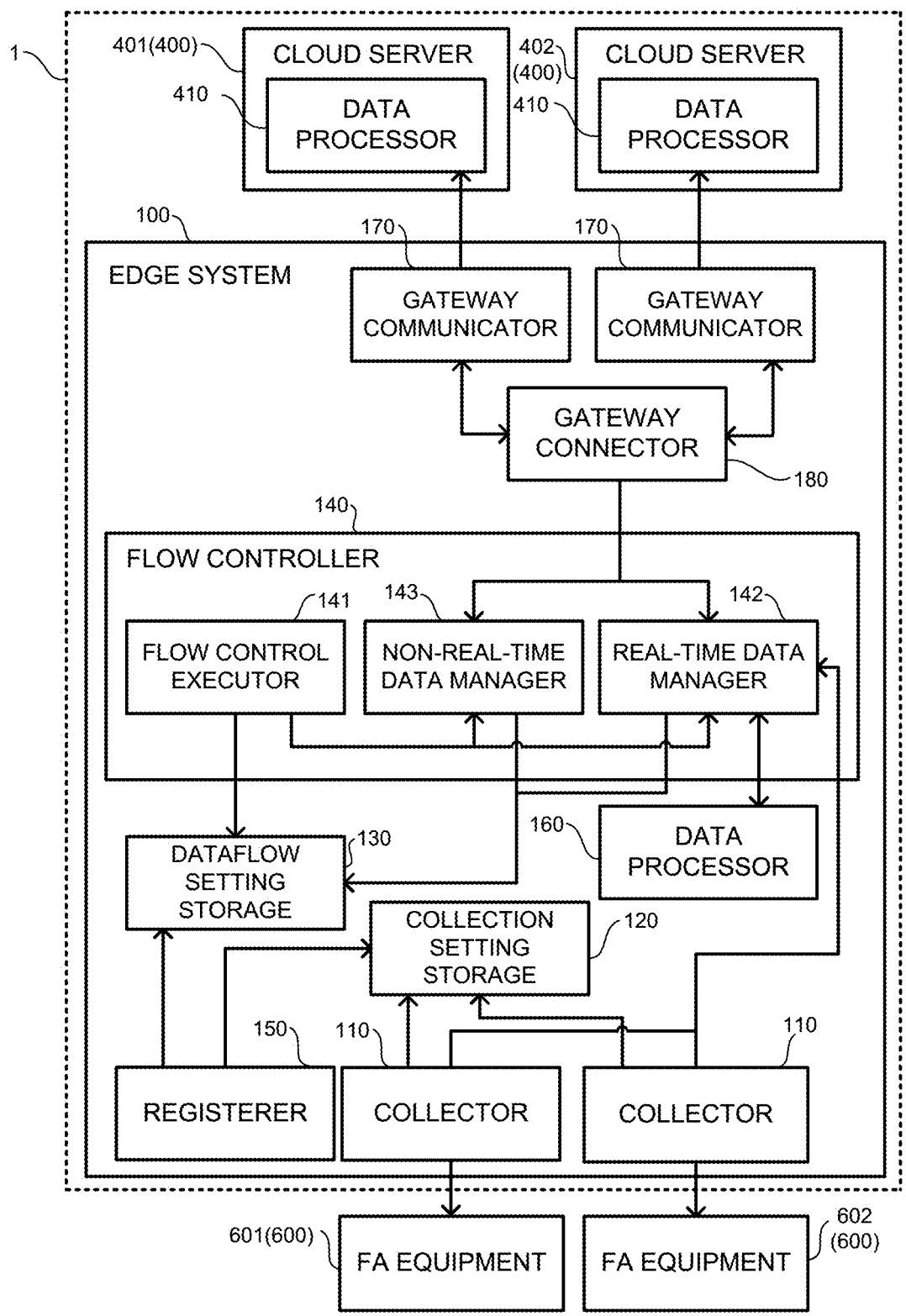
FIG. 1 is a block diagram illustrating a functional configuration of a data coordination system according to an embodiment of the present disclosure.

A data coordination system 1 illustrated in FIG. 1 collects data from FA equipment 601 and 602 in a factory and analyzes the collected data. The data coordination system 1 includes an edge system 100 disposed in the factory, and cloud servers 401 and 402 that provide cloud computing services. The edge system 100 is a system that is run on-premise. The cloud servers 401 and 402 are provided by a service provider different from an operator of the edge system 100. The cloud servers 401 and 402 provide data analysis services. The edge system 100 collects data from the FA equipment 601 and 602 and sends the collected data to the cloud servers 401 and 402. The cloud servers 401 and 402 analyze the data collected by the edge system 100. The cloud servers 401 and 402 are hereinafter collectively referred to as a cloud server 400. The edge system 100 is an example of the data processing system of the present disclosure.

Examples of the FA equipment 601 and 602 include devices in the factory, such as an actuator, a sensor, a control device that controls the actuator and the sensor. The data collected by the edge system 100 includes data obtained by a vibration sensor, a temperature sensor, a pressure sensor, a flow sensor, or the like, provided in the FA equipment 601 and 602. The FA equipment 601 and 602 are hereinafter collectively referred to as FA equipment 600.

Figure 2:
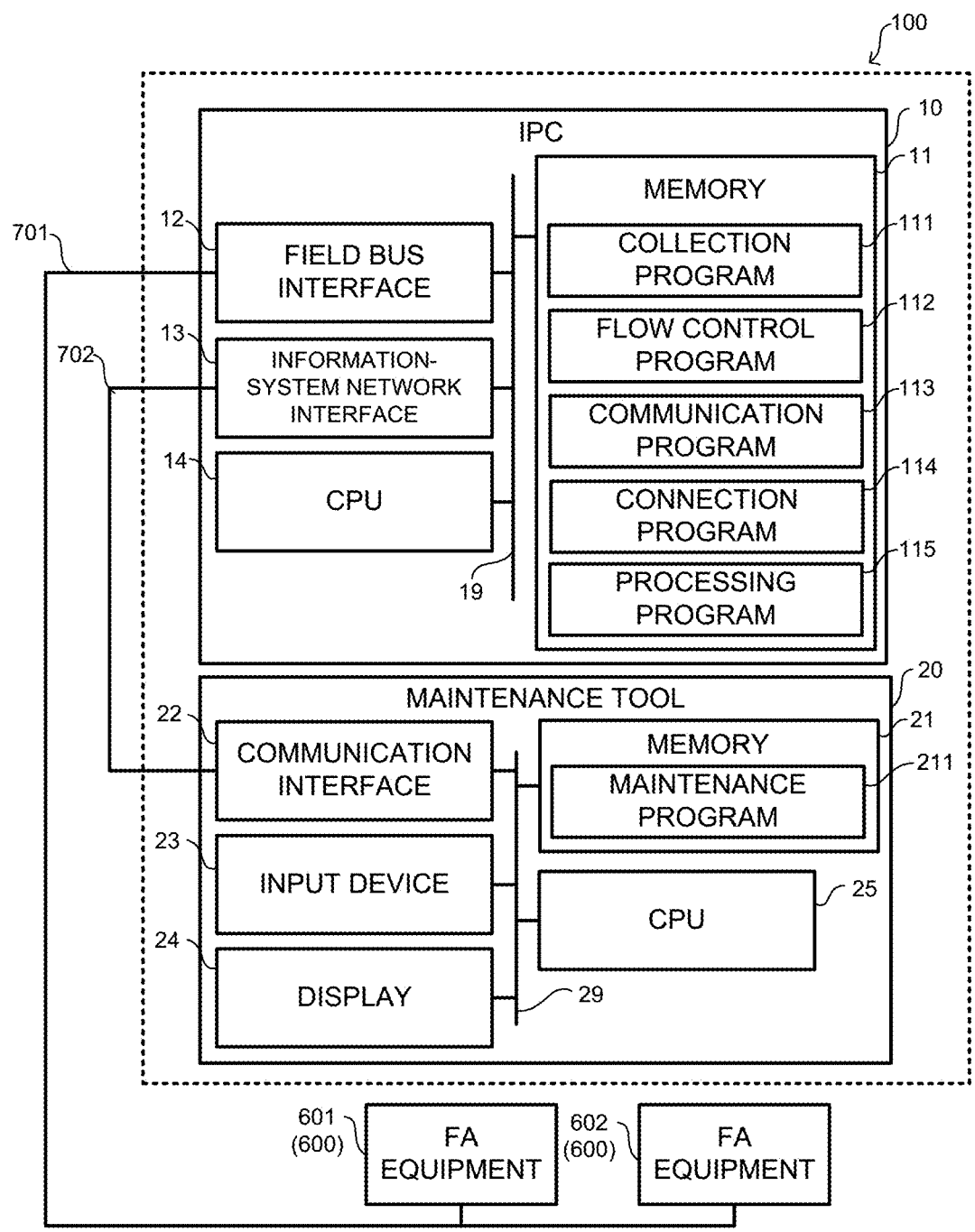
FIG. 2 is a diagram illustrating a hardware configuration of each device included in an edge system according to the embodiment.

Next, hardware configurations of devices included in the edge system 100 are described. As illustrated in FIG. 2, the edge system 100 includes an industrial personal computer (IPC) 10 and a maintenance tool 20. In the illustrated example, the IPC 10 collects data from the FA equipment 600 via a network 701. The IPC 10 communicates with the maintenance tool 20 via a network 702. The maintenance tool 20 is a tool for a user to operate the IPC 10. Here, the user includes an operator of the edge system 100. The IPC 10 is an example of the data processing device of the present disclosure.

The IPC 10 includes, as a hardware configuration, a memory 11 that stores various types of programs and data, a field bus interface 12 that communicates with another device via the network 701, an information-system network interface 13 that communicates with another device via the network 702, and a central processing unit (CPU) 14 that controls the overall IPC 10. The memory 11, the field bus interface 12, and the information-system network interface 13 are connected to the CPU 14 via a bus 19 and each communicate with the CPU 14.

The memory 11 includes a volatile memory and a non-volatile memory. The memory 11 stores programs for implementing various types of functions of the IPC 10. Specifically, the memory 11 stores a collection program 111, a flow control program 112, a communication program 113, a connection program 114, and a processing program 115. In addition, the memory 11 is used as working memory of the CPU 14.

The collection program 111 is a program for allowing the IPC 10 to implement a function for collecting data from the FA equipment 600. The flow control program 112 is a program for allowing the IPC 10 to implement a function for controlling dataflow in the IPC 10. The user creates the collection program 111 and the flow control program 112 or a system developer creates the collection program 111 and the flow control program 112 based on user instructions. The dataflow is hereinafter referred to as a preset flow of data processing in the data coordination system 1.

The communication program 113 is a program for allowing the IPC 10 to implement a function for communicating with the cloud server 400. Specifically, the communication program 113 is a program for implementing a function for converting data received from the edge system 100 in compliance with a specification of the interface defined with respect to receiving and sending of data in the edge system 100 into data defined with respect to receiving and sending data from and to a cloud, and sending the data obtained through conversion to the cloud server 400. The interface defined with respect to receiving and sending of data in the edge system 100 may be hereinafter referred to as an internal interface. The interface defined with respect to receiving and sending of data from and to the cloud may be hereinafter referred to as a cloud-side interface. The cloud-side interface is an example of an external interface of the present disclosure. The internal interface is an example of an internal interface of the present disclosure.

The internal interface includes a protocol that defines data form for use in the edge system 100. A system provider of the edge system 100 publicly releases the specifications of the internal interface. The cloud-side interface includes rules that define procedures for using services provided by the cloud server 400, data format, and/or the like. The service provider of the cloud computing service publicly releases the specifications of the cloud-side interface. In the embodiment, assumption is made that a third-party vendor developed the communication program 113 according to the publicly-released internal interface and the publicly-released cloud-side interface.

The connection program 114 is a program for allowing the IPC 10 to implement a function for passing to the communication program 113 the data flowing in dataflow in the edge system 100. As described above, the communication program 113 is a program developed separately by the third-party vendor and is not a program specific to the edge system 100. Thus the connection program 114 functions as an adaptor for passing to the communication program 113 the data processed by the flow control program 112. The user creates the connection program 114 or a system developer creates the connection program 114 based on user instructions.

The processing program 115 is a program for allowing the IPC 10 to implement a function for executing predetermined processing of data. The predetermined processing is missing value processing, data cutout processing, outlier processing, and the like. The user creates the processing program 115 or a system developer creates the processing program 115 based on user instructions.

The field bus interface 12 includes a network interface circuit, and communicates with the FA equipment 600 via the network 701 under control of the CPU 14. The network 701 is a network compliant with a field network standard.

The information-system network interface 13 includes a network interface circuit, and communicates with the maintenance tool 20 via the network 702 under control of the CPU 14. The network 702 is a network compliant with a standard, such as 10BASE-T or 100BASE-T.

The CPU 14 executes various types of programs stored in the memory 11 to implement various types of functions of the IPC 10. Specifically, the CPU 14 collects data from the FA equipment 600 by executing the collection program 111. The CPU 14 controls dataflow of the data in the edge system 100 by executing the flow control program 112.

By executing the communication program 113, the CPU 14 receives the data from the edge system 100 in compliance with the specification of the internal interface and sends the received data to the cloud server 400 in compliance with the specification of the cloud-side interface.

By executing the connection program 114, the CPU 14 passes the data collected from the FA equipment 600 to the communication program 113 in order to send the collected data the cloud server 400.

By executing the processing program 115, the CPU 14 executes missing value processing, outlier processing, and the like and processes data.

The maintenance tool 20 is disposed in a factory where FA equipment 600 is disposed, and is a personal computer with a dedicated application installed. The maintenance tool 20 includes, as hardware configuration, a memory 21 that stores various types of programs and data, a communication interface 22 that communicates with another device via the network 702, an input device 23 that detects an input operation by a user, a display device 24 that outputs an image, and a CPU 25 that controls the overall maintenance tool 20. The memory 21, the communication interface 22, the input device 23, and the display device 24 are connected to the CPU 25 via a bus 29 and each communicate with the CPU 25.

The memory 21 includes a volatile memory and a non-volatile memory. The memory 21 stores programs for implementing various types of functions of the maintenance tool 20. Specifically, the memory 21 stores a maintenance program 211. The memory 21 is used as working memory of the CPU 25.

The maintenance program 211 is a program for allowing the maintenance tool 20 to implement a function for registering in the IPC 10 various types of parameters necessary for operation of the edge system 100 in accordance with user's operation instructions.

The communication interface 22 includes a network interface circuit, and communicates with the IPC 10 via the network 702 under control of the CPU 25. The input device 23 includes a mouse, an operation key, and/or the like, and receives an operation input from a user and outputs to the CPU 25 a signal indicating the operation input of the user. The display device 24 includes a display, and displays on the display an image based on the signal supplied by the CPU 25.

The CPU 25 executes various types of programs stored in the memory 21 to implement various types of functions of the maintenance tool 20. Specifically, by executing the maintenance program 211, the CPU 25 displays, on the display of the display device 24, an input screen for input of various types of parameters necessary for an operation of the edge system 100. The CPU 25 stores, in the memory 11 of the IPC 10, a parameter input by a user using the input device 23. The above is the hardware configuration of the IPC 10 and the maintenance tool 20 included in the edge system 100. In the embodiment, the third-party vendor who provides the communication program 113 provides an input screen for the parameters necessary for operation of the communication program 113.

Next, a functional configuration of the edge system 100 is described with reference to FIG. 1.

The edge system 100 functionally includes a collector 110 that collects data from a specified collection target, a collection setting storage 120 that stores data indicating a setting about data collection, a dataflow setting storage 130 that stores data indicating a setting about a data flow, a flow controller 140 that controls a data flow, a registerer 150 that registers to the edge system 100 various types of parameters necessary for an operation of the edge system 100, a data processor 160 that performs predetermined data processing, a gateway communicator 170 that communicates with a cloud server 400, and a gateway connector 180 that performs data receiving and sending between the flow controller 140 and the gateway communicator 170.

The collector 110 collects specified data from a specified target at specified collection intervals based on a setting about data collection stored in the collection setting storage 120, and outputs the collected data to the flow controller 140. The data collected by the collector 110 is hereinafter referred to as collection data. In the embodiment, the collector 110 collects the data from the FA equipment 600. The function of the collector 110 is implemented by the CPU 14 illustrated in FIG. 2 executing the collection program 111. The collector 110 is an example of data collection means of the present disclosure.

The collection setting storage 120 illustrated in FIG. 1 stores data indicating content of settings about data collection processing executed by the collector 110. This data is sometimes referred to as collection setting data. The collection setting data includes information specified by a user, that is, information for specifying a target of collection, information for specifying data to be collected, a collection interval for data collection, and information for specifying the collection program 111 that executes the collection processing. The information for specifying the target of collection includes, for example, an Internet protocol (IP) address and a port number. The information for specifying the data to be collected includes information indicating an area where the data to be collected in a memory area of the FA equipment 600 is stored and information indicating a data type and a data length of the data. The information for specifying the collection program 111 includes an execution file name and a path. The registerer 150 described later stores, based on user instructions, the collection setting data in the collection setting storage 120. The function of the collection setting storage 120 is implemented by the memory 11 illustrated in FIG. 2.

The dataflow setting storage 130 stores setting content about dataflow in which content of data processing performed on the collected data and an order of the data processing are defined. Such data is sometimes referred to as dataflow setting data. The dataflow setting data includes information specified by a user and indicating the collection target and the entity who executes each step. The dataflow setting data includes the IP address and the port number for specifying the cloud server 400, service information for specifying the service provided by the cloud server 400, information indicating a type of data flowing in dataflow, and script information for extension of the gateway communicator 170. In addition, the dataflow setting storage 130 is an area where data to be sent to the cloud server 400 is stored, and stores a path for specifying a place of the data store 1400 described later. The registerer 150 stores the aforementioned data in the dataflow setting storage 130 based on user instructions. The dataflow setting storage 130 is an example of dataflow setting storage means. The function of the dataflow setting storage 130 is implemented by the memory 11 illustrated in FIG. 2.

The flow controller 140 illustrated in FIG. 1 controls dataflow in the edge system 100. The function of the flow controller 140 is implemented by the CPU 14 illustrated in FIG. 2 executing the flow control program 112. The flow controller 140 is an example of flow control means of the present disclosure.

Specifically, the flow controller 140 includes a flow control executor 141, a real-time data manager 142, and a non-real-time data manager 143.

Upon activation of the edge system 100, the flow control executor 141 activates the gateway communicator 170 based on the data stored in the dataflow setting storage 130. The flow control executor 141 activates a number of gateway communicators 170 corresponding to the number of the cloud servers 400. For example, in a case where the edge system 100 is set to be connected to two cloud servers 400 in the dataflow setting data stored in the dataflow setting storage 130, the flow control executor 141 activates two gateway communicators 170 so as to be connected to the corresponding cloud servers 400.

This is because different cloud-side interfaces for different cloud servers 400 need activation of the communication program 113 illustrated in FIG. 2 for functioning as the gateway communicators 170 corresponding to the cloud servers 400. The flow control executor 141 assigns a unique identifier (ID) to each of the gateway communicators 170 to identify the activated gateway communicators 170. This is for enabling the gateway connector 180 to identify the gateway communicator 170 in receiving and sending of data between the gateway connector 180 and the gateway communicator 170.

Figure 3:
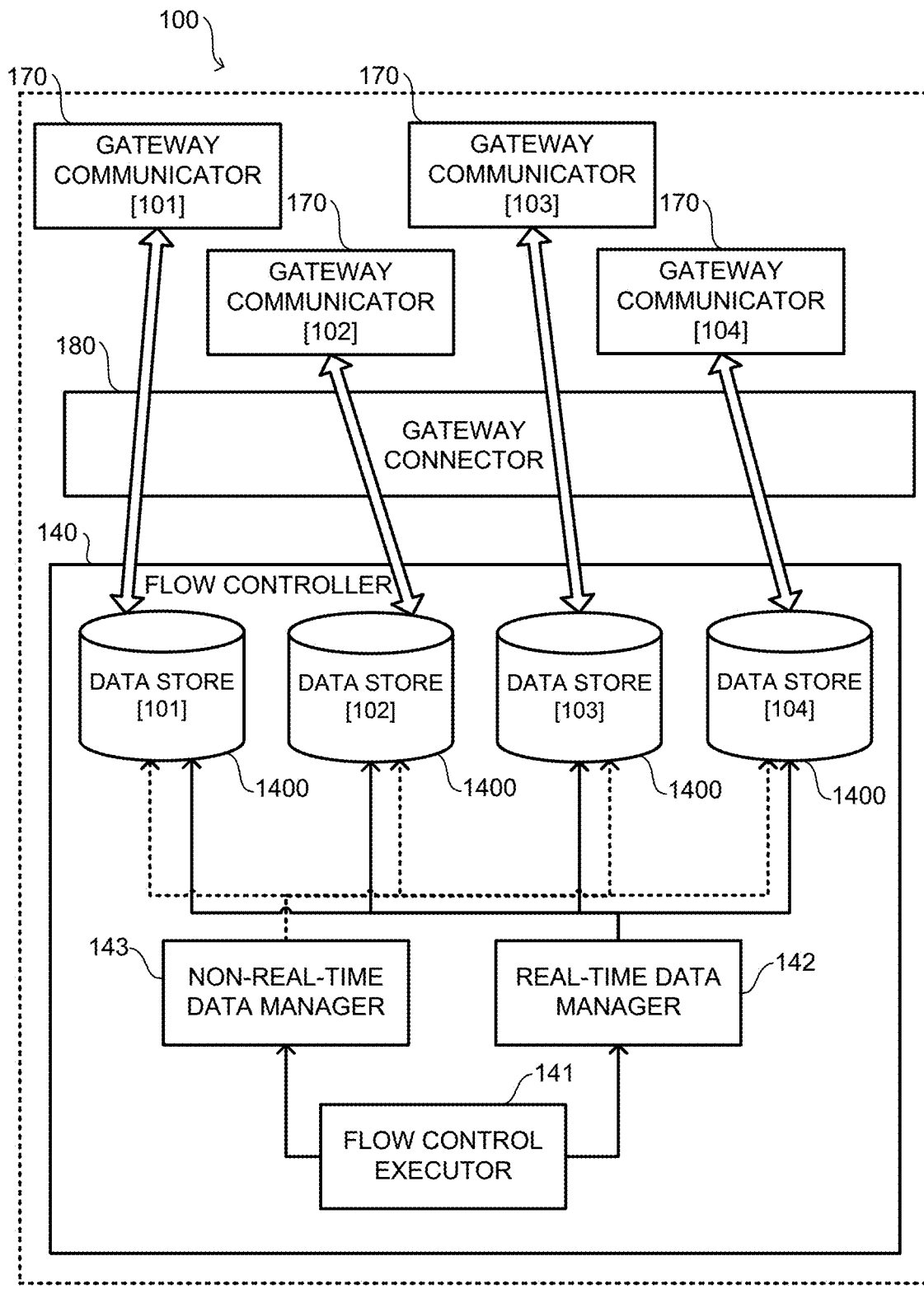
FIG. 3 is a drawing for describing receiving and sending of data in a data store according to the embodiment.

Furthermore, as illustrated in FIG. 3, the flow control executor 141 generates the data store 1400 corresponding to each of the gateway communicators 170 for receiving and sending of the data from and to the gateway communicator 170. The data store 1400 is an area readable and rewritable by the gateway communicator 170. Each data store 1400 is identifiable per the unique ID assigned to the gateway communicator 170. In an example illustrated in FIG. 3, four gateway communicators 170 are activated. The gateway communicators 170 are assigned the unique IDs 101 to 104. In addition, four data stores 1400 corresponding to the respective gateway communicators 170 are generated. FIG. 3 only illustrates the flow controller 140, the gateway communicator 170, and the gateway connector 180. The data store 1400 is an example of data storage means of the present disclosure.

The flow control executor 141 sends, to the real-time data manager 142 and the non-real-time data manager 143, information indicating association between the generated data store 1400 and the unique ID.

The real-time data manager 142 supplies, to a destination specified based on the dataflow setting data, the data generated in real time, which is herein the collection data received from the collector 110. In a case where the data processor 160 is specified as a destination of the data, the real-time data manager 142 supplies the data to the data processor 160.

The real-time data manager 142 stores the data generated in real time in the data store 1400 to pass the data to the cloud server 400. Specifically, the real-time data manager 142 stores in the data store 1400 the collection data supplied from the collector 110. In addition, the real-time data manager 142 stores the real-time data in the data store 1400 to pass the real-time data to the cloud server 400. In a case where missing value processing is performed on missing data in the data collected by the collector 110, the real-time data includes information relating to missing value processing. For example, in a case where the data processor 160 performs missing value processing that fills in a value set in the missing value of the collection data, the real-time data manager 142 stores, in the data store 1400 as real-time data, information for specifying a missing value and the value filled in the missing value.

Furthermore, for example, in a case where the collection data is time-series data, the data processor 160 may cut out the collection data at specified intervals, and the edge system 100 may send the cut-out data in several portions to the cloud server 400. In this case, the real-time data manager 142 stores, in the data store 1400 as real-time data, information indicating a start position and an end position of the time-series data. In addition, the real-time data includes information indicating state of progress of the dataflow and information indicating processing load of the IPC 10 that functions as the edge system 100. The information indicating the processing load is, for example, a utilization rate of a processor of the IPC 10. The real-time data manager 142 is an example of real-time data management means of the present disclosure.

The non-real-time data manager 143 stores, for example, non-real-time data in the data store 1400 to pass the data to the cloud server 400. The non-real-time data is stored in the dataflow setting storage 130. The non-real-time data includes the dataflow setting data, the IP address and the port number that are connection information for connection to the cloud server 400, service information for specifying the service provided by the cloud server 400, information indicating data flowing in dataflow, and script information for extension of the gateway communicator 170. The non-real-time data manager 143 stores the non-real-time data in the data store 1400 immediately after activation of the gateway communicator 170. The non-real-time data manager 143 is an example of the non-real-time data management means of the present disclosure.

The registerer 150 illustrated in FIG. 1 stores, in the collection setting storage 120, the collection setting data input by a user. In addition, the registerer 150 stores in the dataflow setting storage 130 the dataflow setting data input by the user, and the like. The function of the registerer 150 is implemented by the CPU 25 of the maintenance tool 20 illustrated in FIG. 2 executing the maintenance program 211.

The data processor 160 illustrated in FIG. 1 applies predetermined processing to the collection data supplied from the flow controller 140 and supplies the processed collection data to the flow controller 140. The processing includes missing value processing, cutout processing, outlier processing, and the like, which are pre-processing of analysis processing. The function of the data processor 160 is implemented by the CPU 14 illustrated in FIG. 2 executing the processing program 115. The data processor 160 is an example of data processing means of the present disclosure.

The gateway communicator 170 illustrated in FIG. 1 sends, to the cloud server 400, data that is destined for the cloud server 400 from the edge system 100. Specifically, the gateway communicator 170, at set intervals, queries the gateway connector 180 as to whether or not there is data destined for the cloud server 400, and when there is the data, reads the data from the data store 1400. The interval at which the gateway communicator 170 queries about presence/absence of data is, for example, a period defined at the cloud-side interface. The gateway communicator 170 converts the data read from the data store 1400 in to data format determined at the cloud-side interface. The gateway communicator 170 sends the converted data to the cloud server 400 in procedures determined at the cloud-side interface. The function of the gateway communicator 170 is implemented by the CPU 14 illustrated in FIG. 2 executing the communication program 113. The gateway communicator 170 is an example of gateway communication means of the present disclosure.

Upon being queried by the gateway communicator 170 about presence/absence of data, the gateway connector 180 illustrated in FIG. 1 confirms whether or not there is data corresponding to the gateway communicator 170 in the data store 1400, and notifies the gateway communicator 170 about the presence/absence of data. As described above, the communication program 113 for implementing the function of the gateway communicator 170 is a program developed by the third-party vendor and is not a program specific to the edge system 100. Thus the gateway connector 180 needs to mediate data exchange between the gateway communicator 170 and the flow controller 140.

In addition, upon being notified by the gateway communicator 170 to discard data for which reading from the data store is completed, the gateway connector 180 discards the data from the data store 1400. The function of the gateway connector 180 is implemented by the CPU 14 illustrated in FIG. 2 executing the connection program 114. The gateway connector 180 is an example of gateway connection means of the present disclosure.

Next, a functional configuration of the cloud server 400 is described. As illustrated in FIG. 1, the cloud server 400 functionally includes a data processor 410 that executes analysis processing.

The data processor 410 analyzes data supplied from the edge system 100. For example, the data processor 410 provides, in response to request by a user of the edge system 100, an analysis result to the user.

Next, a flow of obtaining data by the gateway communicator 170 from the data store 1400 of the flow controller 140 is described with reference to FIGS. 4 and 5.

Figure 4:
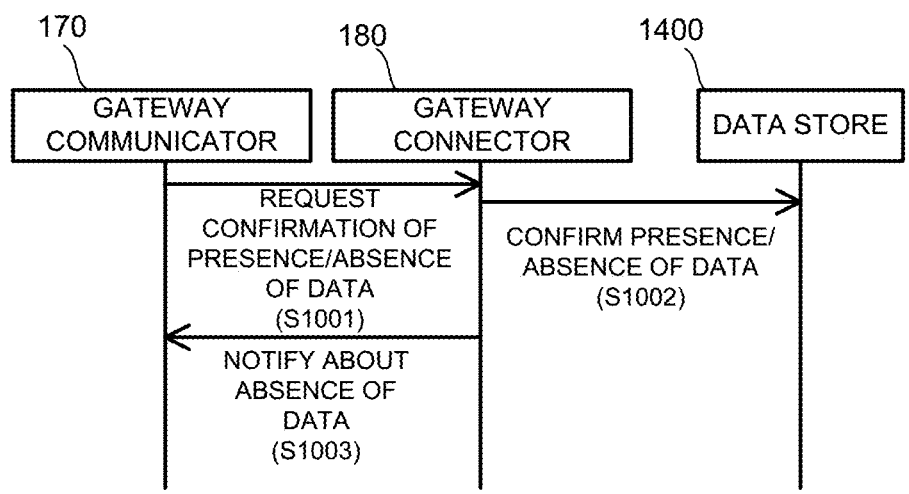
FIG. 4 is a diagram illustrating an example of a flow of data according to the embodiment.

As illustrated in FIG. 4, the gateway communicator 170 queries the gateway connector 180 about presence/absence of data (step S1001). The gateway connector 180 confirms whether there is data in the data store 1400 (step S1002). Data is assumed not to exist in the data store 1400 in the illustrated example. In this case, the gateway connector 180 notifies the gateway communicator 170 that there is no data (step S1003).

Figure 5:
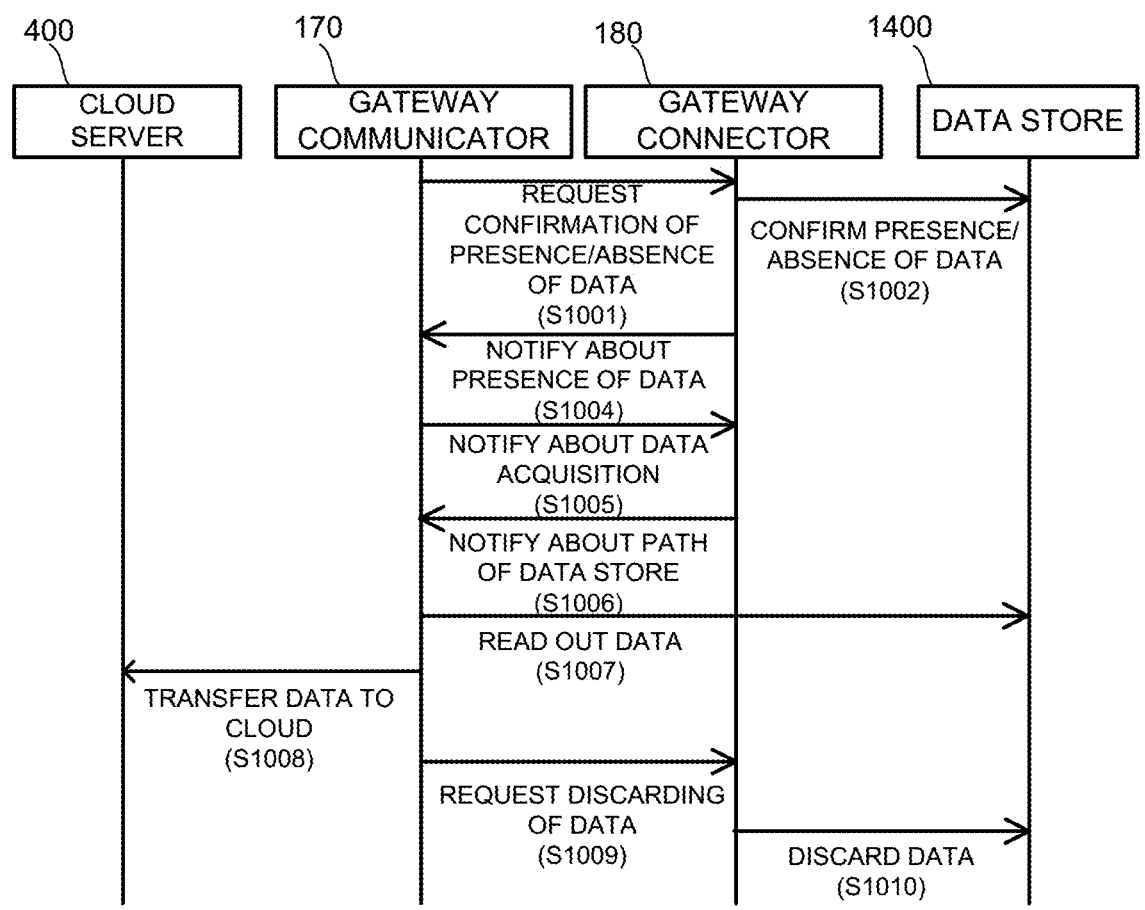
FIG. 5 is a diagram illustrating another example of a flow of data according to the embodiment.

As illustrated in FIG. 5, in a case where there is data in the data store 1400, upon the gateway communicator 170 querying about presence/absence of data (step S1001), the gateway connector 180 confirms whether there is data in the data store 1400 (step S1002), and notifies the gateway communicator 170 that there is data (step S1004). In response to this, the gateway communicator 170 notifies the gateway connector 180 of the obtaining of the data (step S1005).

The gateway connector 180 notifies the gateway communicator 170 about a path for specifying a location of the data store 1400 (step S1006). In response to this, the gateway communicator 170 reads the data from the data store 1400 (step S1007). The gateway communicator 170 transfers the read data to the cloud server 400 (step S1008). Then the gateway communicator 170 instructs the gateway connector 180 to discard the data (step S1009). In response to this, the gateway connector 180 discards the data of the data store 1400 (step S1010).

For receiving and sending of data between the edge system 100 and the cloud server 400, the gateway connector 180 and the gateway communicator 170 are to perform preparation processing described below. The preparation processing by the gateway connector 180 is first described. The gateway connector 180 starts the following preparation processing after activation of the edge system 100.

Figure 6:
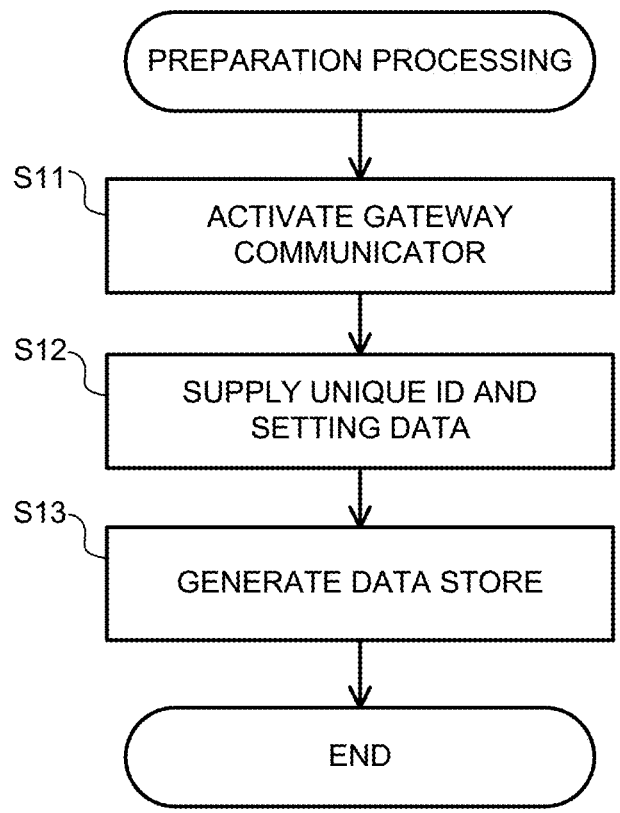
FIG. 6 is a flowchart of preparation processing of a gateway connector according to the embodiment.

As illustrated in FIG. 6, the gateway connector 180 activates the gateway communicators 170 corresponding to the respective cloud servers 400 connected by the edge system 100 (step S11). The gateway connector 180 assigns unique IDs to the corresponding activated gateway communicators 170, and supplies, to the gateway communicators 170, the unique IDs and setting data necessary for communication with the cloud servers 400 (step S12). Then the gateway connector 180 generates data stores 1400 for storing data to be passed to the corresponding gateway communicators 170 (step S13). The above is the preparation processing executed by the gateway connector 180.

Figure 7:
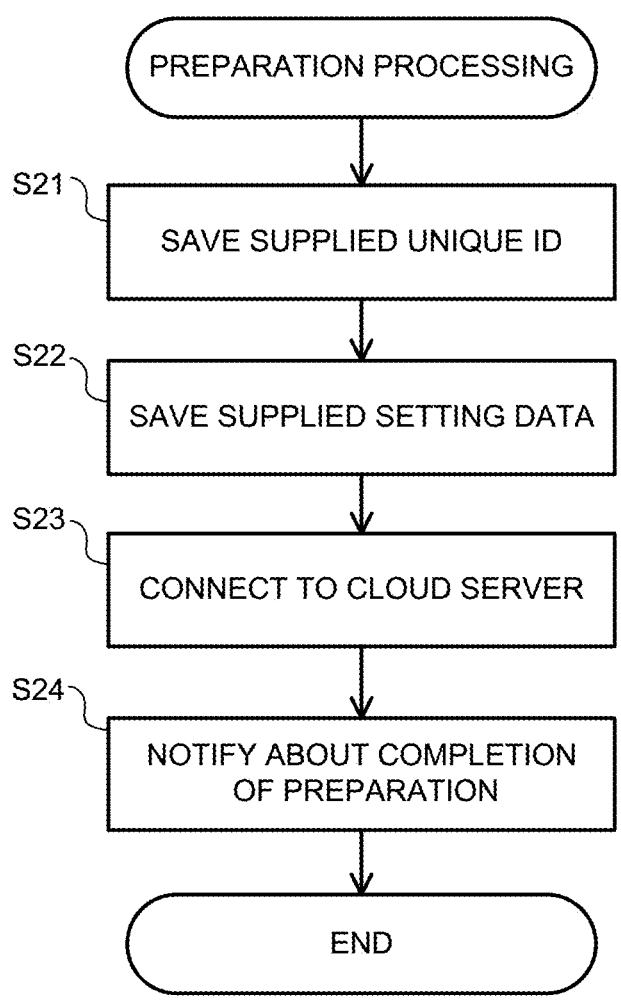
FIG. 7 is a flowchart of preparation processing of a gateway communicator according to the embodiment.

Next, the preparation processing of the gateway communicator 170 is described. As illustrated in FIG. 7, the gateway communicator 170 saves the unique ID supplied by the gateway connector 180 (step S21). The gateway communicator 170 saves setting data supplied by the gateway connector 180 (step S22). Then the gateway communicator 170 connects to the cloud server 400 specified by the setting data supplied by the gateway connector 180 (step S23). Upon connection to the cloud server 400, the gateway communicator 170 notifies the gateway connector 180 that preparation is completed (step S24).

Next, processing of transferring data to the cloud server 400 by coordination of the gateway connector 180 and the gateway communicator 170 with the completed preparation processing is described. The transfer processing executed by the gateway communicator 170 is first described.

Figure 8:
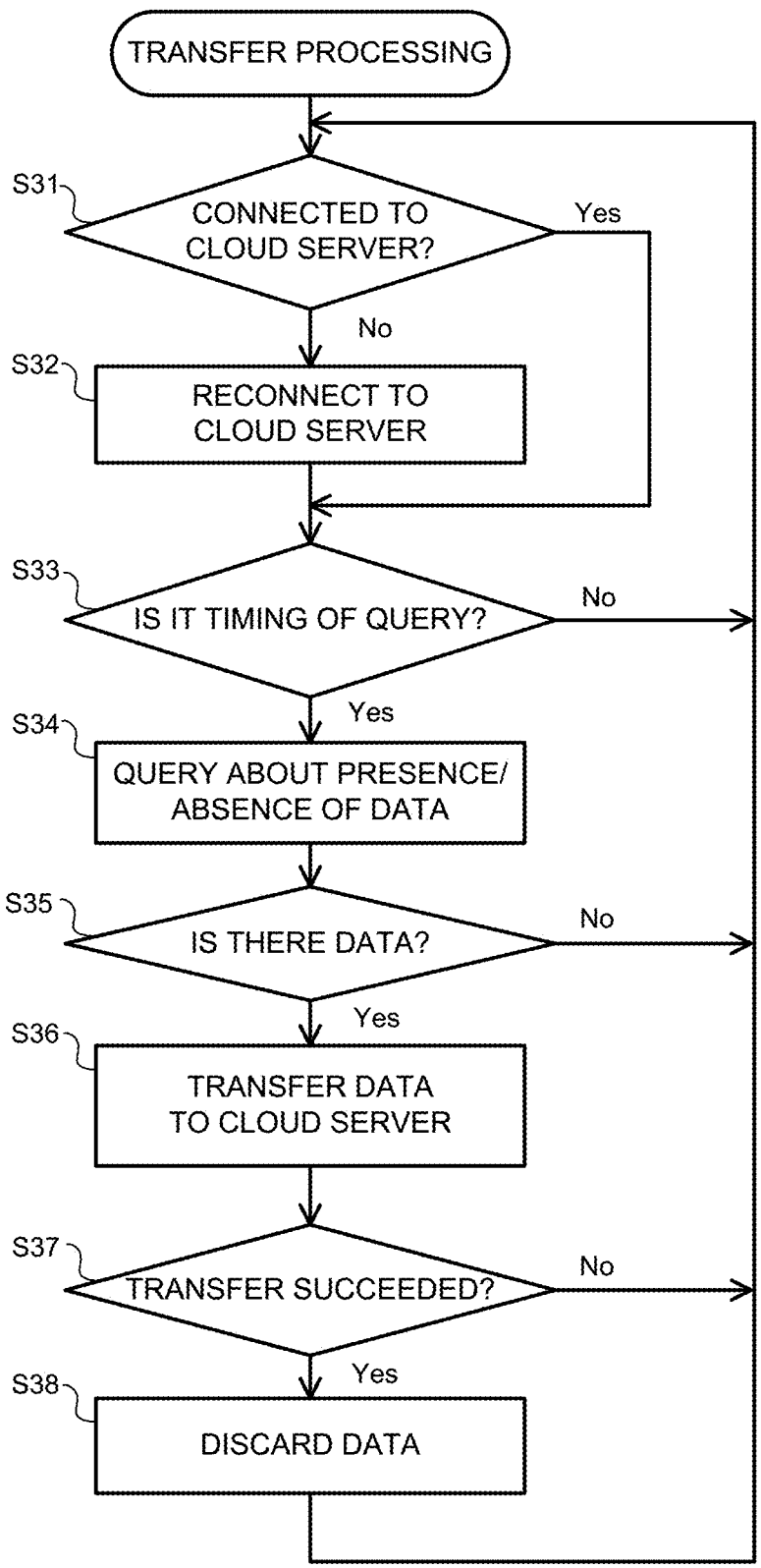
FIG. 8 is a flowchart of transfer processing of the gateway communicator according to the embodiment.

As illustrated in FIG. 8, the gateway communicator 170 determines whether or not the gateway communicator 170 is connected to the cloud server 400 (step S31). When there is no connection to the cloud server 400 (No in step S31), the gateway communicator 170 reconnects to the cloud server 400 (step S32). The gateway communicator 170 determines from the setting interval whether or not the present time is a timing for query about presence/absence of data (step S33). A value indicating a specified period is included in the setting data supplied by the gateway connector 180 in the preparation process. Upon determination that the present time is the timing for the query about presence/absence of data (Yes in step S33), the gateway communicator 170 queries the gateway connector 180 about presence/absence of data (step S34).

Based on whether or not a path of the data store 1400 is returned from the gateway connector 180, the gateway communicator 170 determines whether there is data in the data store 1400 (step S35). Upon determination that there is data (Yes in step S35), the gateway communicator 170 reads the data from the data store 1400 and transfers the read data to the cloud server 400 (step S36). Then, upon determination of success in the transfer of the data (Yes in step S37), the gateway communicator 170 instructs the gateway connector 180 to discard the data (step S38). Then the gateway communicator 170 executes the processing of step S31 again.

Upon determination that the transfer of the data fails in step S37 (No in step S37), the gateway communicator 170 executes processing of step S31 again without instructing the gateway connector 180 to discard the data. This is because, due to the transfer of the data to the cloud server 400 ending in failure, the gateway communicator 170 transfers the data to the cloud server 400 at the next transfer timing. Thus, in this case, there is no instruction to discard the data.

Upon determination that there is no data in the data store 1400 in step S35 (No in step S35), the gateway communicator 170 executes the processing of step S31 again.

Figure 9:
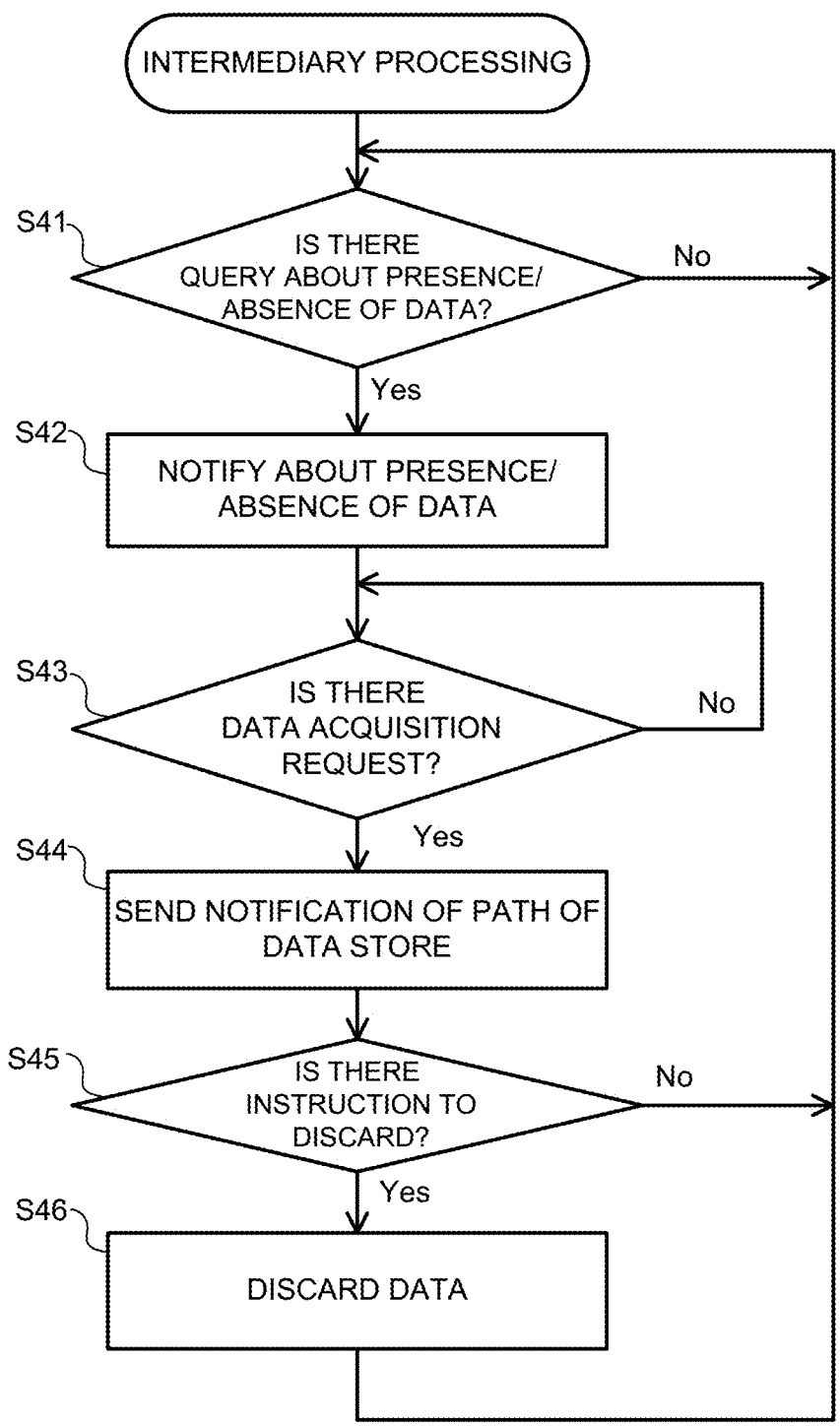
FIG. 9 is a flowchart of intermediary processing of the gateway connector according to the embodiment.

Next, intermediary processing executed by the gateway connector 180 is described. As illustrated in FIG. 9, upon reception of the query about presence/absence of data from the gateway communicator 170 (Yes in step S41), the gateway connector 180 notifies the gateway communicator 170 about the presence/absence of data (step S42). Specifically, the gateway connector 180 confirms whether or not there is data in the data store 1400 assigned to the gateway communicator 170 having sent the query. In a case where there is data in the data store 1400, the gateway connector 180 notifies the gateway communicator 170 about the path of the data store 1400, and in a case where there is no data in the data store 1400, the gateway connector 180 notifies the gateway communicator 170 that there is no data.

Upon reception of a request for obtaining the data from the gateway communicator 170 (Yes in step S43), the gateway connector 180 notifies the corresponding gateway communicator 170 (step S44) about the path of the data store 1400 assigned thereto. Then upon reception of an instruction from the gateway communicator 170 to discard the data (Yes in step S45), the gateway connector 180 discards the data of the data store 1400 (step S46).

Upon passage of a certain fixed period without reception of the instruction from the gateway communicator 170 to discard the data after notification of the path of the data store 1400 in step S44 (No in step S45), the gateway connector 180 executes the processing of step S41 again.

As described above, in the embodiment, without the providing of an intermediate server, the gateway communicator 170 included in the edge system 100 and created by a third-party vendor communicates with the cloud server 400 in compliance with the specifications of the cloud-side interface. In addition, the gateway connector 180 connects the gateway communicator 170 with the flow controller 140 that controls dataflow in the data processing system of the data collected from the equipment. In this way, the edge system 100 uses, as means for communicating with the cloud server 400, the gateway communicator 170 provided by the third-party vendor, and includes the gateway connector 180 as means for connecting to the gateway communicator 170. Thus seamless coordination between the data processing system and the external service is enabled without a user of the data processing system being conscious of the interface of the external service.

Use of the gateway communicator 170 created by the third-party vendor enables reduction in man-hours for development of the edge system 100. In addition, in a case where the cloud-side interface is changed, the third-party vendor modifies the gateway communicator 170, and thus a user of the edge system 100 can reduce the man-hours for development.

Modified Example 1

Next, an example of the edge system 100 having a configuration for adjusting communication load is described. The description below focuses on the configuration that differs from the configuration according to the embodiment.

Figure 10:
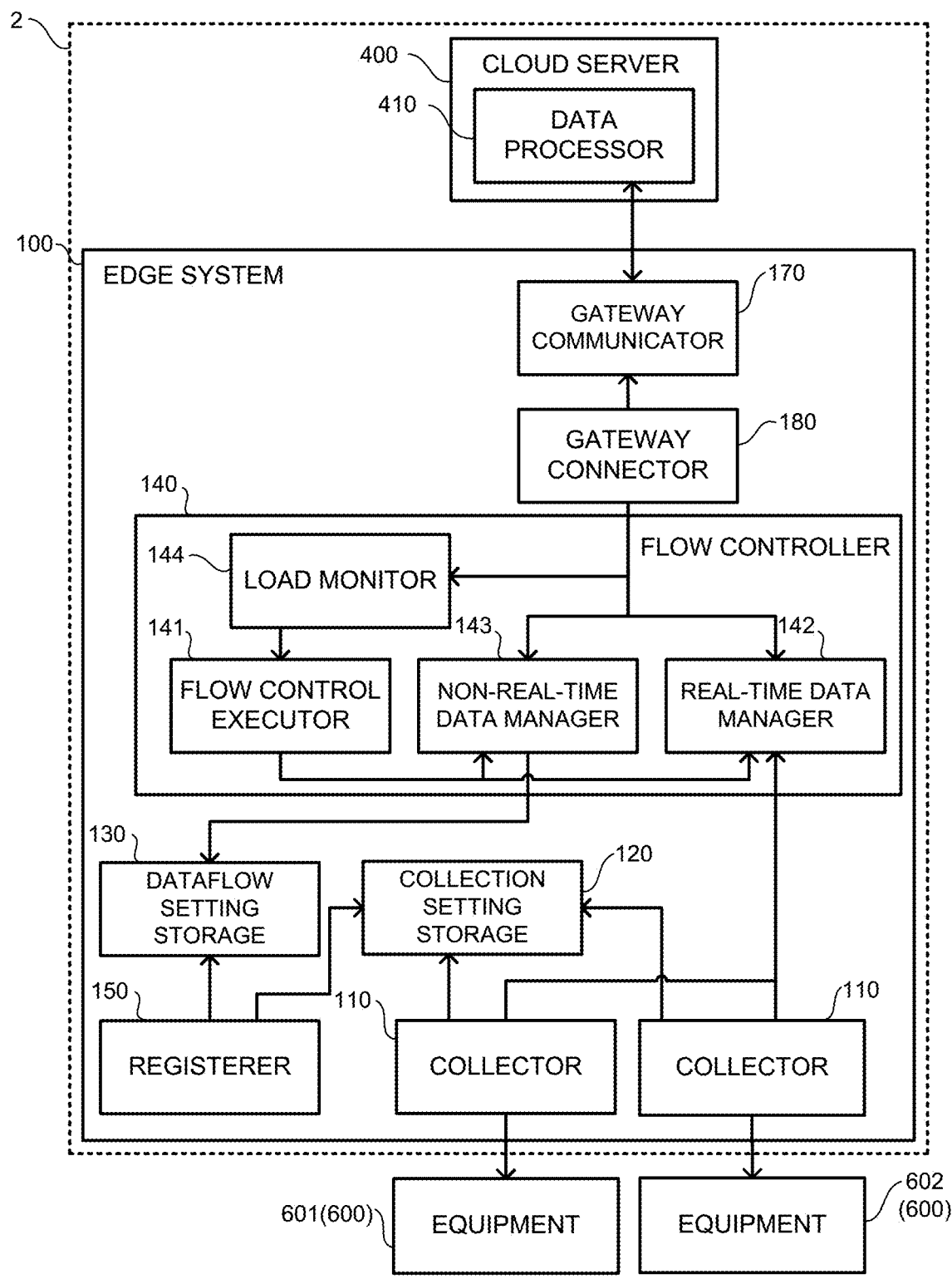
FIG. 10 is a block diagram illustrating a functional configuration of a data coordination system according to Modified Example 1.

FIG. 10 illustrates a configuration of a data coordination system 2 according to Modified Example 1. The flow controller 140 of the edge system 100 according to Modified Example 1 includes the flow control executor 141, the real-time data manager 142, the non-real-time data manager 143, and a load monitor 144. The flow control executor 141, the real-time data manager 142, and the non-real-time data manager 143 have configurations similar to those of the embodiment.

The load monitor 144 obtains, at fixed intervals, a monitoring result of loads in communication between the edge system 100 and the cloud server 400 from the gateway communication executor 171 via the gateway connector 180. The load monitor 144 causes the flow control executor 141 to adjust, in accordance with the communication load, a volume of data for flow to the gateway connector 180. The load monitor 144, for example, provides to the flow control executor 141 an instruction to reduce a volume of data that is to flow to the gateway connector 180. The flow control executor 141 instructs the real-time data manager 142 to extend a period of time to store in the data store 1400 the collection data received from the collector 110. Extension by the real-time data manager 142 of the period of time to store the collection data in the data store 1400 enables suppression of traffic between the edge system 100 and the cloud server 400.

When a monitoring result obtained after adjustment by the flow control executor 141 of the volume of data that is to flow to the gateway connector 180 indicates that the communication load is reduced, the load monitor 144 causes the flow control executor 141 again to adjust the volume of data that is to flow to the gateway connector 180. In this case, the load monitor 144 provides to the flow control executor 141 an instruction to increase the volume of data that is to flow to the gateway connector 180. The flow control executor 141 instructs the real-time data manager 142 to shorten a period of time to store in the data store 1400 the collection data received from the collector 110.

Having such a configuration can reduce the communication load in a case of a high communication load occurring between the cloud server 400 and the edge system 100. In addition, results similar to those of Embodiment 1 can be expected also for the configuration according to Modified Example 1.

Modified Example 2

Next, an example of the edge system 100 and the cloud server 400 including a configuration to adjust a load is described. The description below focus on the configuration that differs from the configurations according to the embodiment and Modified Example 1.

Figure 11:
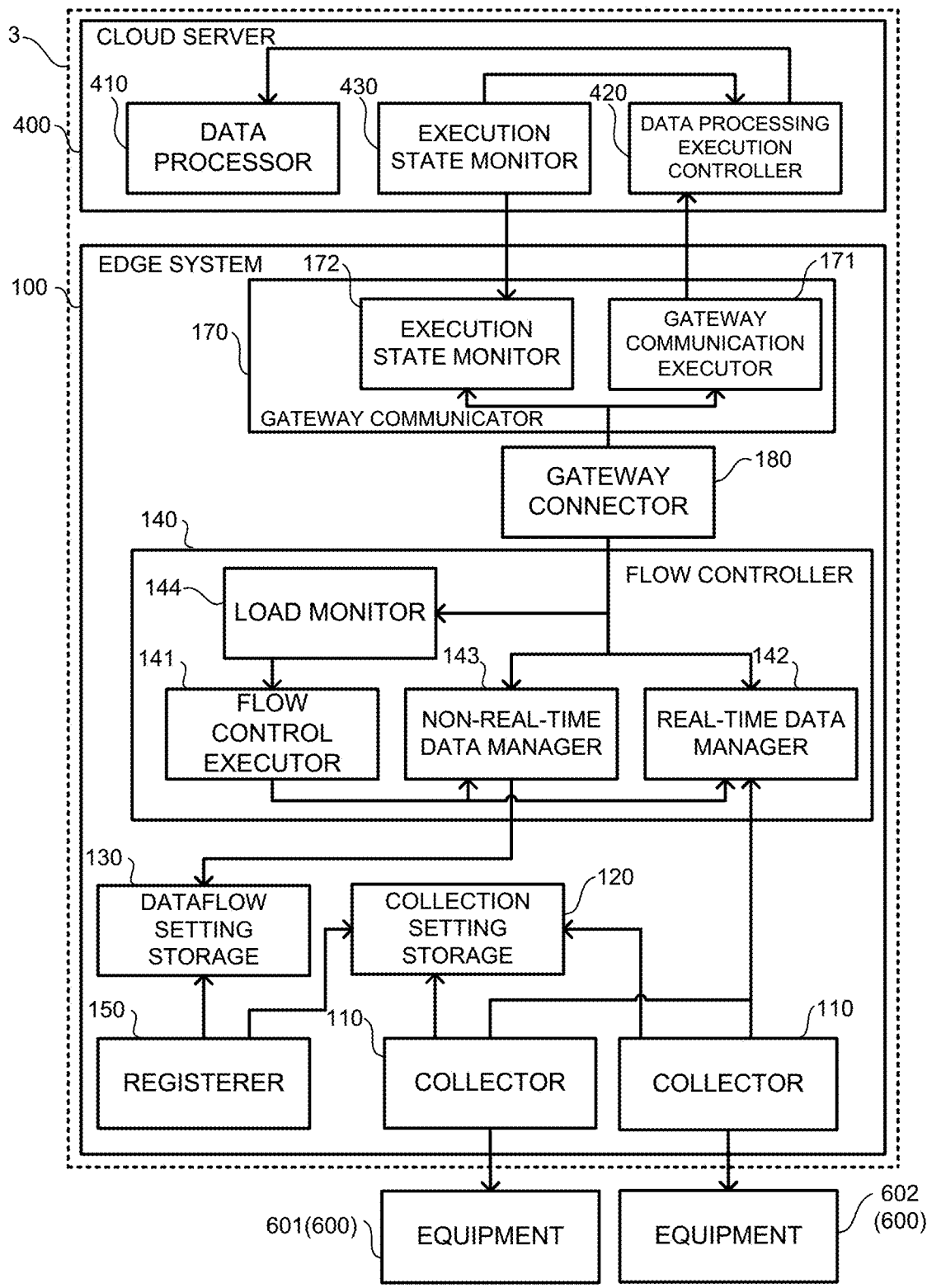
FIG. 11 is a block diagram illustrating a functional configuration of a data coordination system according to Modified Example 2.

FIG. 11 illustrates a configuration of a data coordination system 3 according to Modified Example 2. The gateway communicator 170 of the edge system 100 according to Modified Example 2 includes the gateway communication executor 171 and an execution state monitor 172. The cloud server 400 includes the data processor 410, a data processing execution controller 420, and an execution state monitor 430.

A gateway communication executor 171 has a function of the gateway communicator 170 described in the embodiment. The gateway communication executor 171 sends, to the cloud server 400, data that is destined for the cloud server 400 from the edge system 100.

The execution state monitor 172 monitors a load of processing of the gateway communication executor 171. In addition, the execution state monitor 172 receives a result of monitoring a load of processing of the data processing execution controller 420 from the execution state monitor 430 of the cloud server 400.

For example, in a case of high load of the processing of the gateway communication executor 171, the execution state monitor 172 adjusts the load of the processing of the gateway communication executor 171. In a case of high load of the processing of the data processing execution controller 420, the execution state monitor 172 controls the gateway communication executor 171 so as to reduce the load of the processing of the data processing execution controller 420.

The data processing execution controller 420 supplies to the data processor 410 the data received from the gateway communicator 170. Although the cloud server 400 has a single data processor 410 in the illustrated example, the cloud server 400 may have a plurality of data processors 410. In this case, the data processing execution controller 420 may supply the data to a different data processor 410 in accordance with the received data characteristics. The data processor 410 has a configuration similar to that of the embodiment.

The execution state monitor 430 monitors a load of processing of the data processing execution controller 420 and sends the result of monitoring to the execution state monitor 172 of the edge system 100.

Having such a configuration can reduce the processing load in a case of a high processing load of processing of the cloud server 400 or the edge system 100. In addition, results similar to those of Embodiment 1 can also be expected for the configuration according to Modified Example 2.

Although an example of the edge system 100 sending data to the cloud server 400 is described in the embodiment, the edge system 100 may receive data from the cloud server 400. In this case, the communication program 113 illustrated in FIG. 2 allows the edge system to further implement a function of converting the data received from the cloud server 400 in compliance with the specifications of the cloud-side interface into data compliant with the internal interface, and supplying the resultant data to the edge system 100. By executing the communication program 113, the CPU 14 converts the data received from the cloud server 400 in compliance with the specification of the cloud-side interface into data compliant with the internal interface, and to supply the resultant data to the edge system 100.

Although an example of the IPC 10 including the collector 110 that executes data collection is described in the embodiment, the collector 110 may be provided in another device that is separate from the IPC 10.

Although an example of the data processor 160 of the edge system 100 that performs pre-processing of the data collected by the collector 110 is described in the embodiment, the data processor 160 does not necessarily perform pre-processing of the collection data. In this case, the edge system 100 does not necessarily include the data processor 160.

Although an example of using the IP address and the port number as information for specifying a collection target equipment is described in the embodiment, the information is not limited there to. As the information for specifying the collection target equipment, a station number on the network may be used as the information for specifying the collection target equipment.

Although an example of the cloud server 400 performing analysis processing is described in the embodiment, services provided by the cloud server 400 are not limited thereto. The cloud server 400 may diagnose the FA equipment 600 based on the analysis result. The cloud server 400 may provide a storage service for accumulation of the received data. A single cloud server 400 may provide a plurality of services. In this case, the IPC 10 is to have to have the gateway communicators 170 corresponding to the respective interfaces for different services.

Although an example of the edge system 100 coordinating with the cloud computing service is described in the embodiment, the coordination of the edge system 100 is not limited thereto. The edge system 100 may coordinate with an external application other than the cloud computing service.

Examples of media usable as a recording medium for recording the above programs include a magnetic disk, an optical disk, a magneto-optical disk, a flash memory, a semiconductor memory, and a magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Data coordination system
10 IPC
11, 21 Memory
12 Field bus interface
13 Information-system network interface
14, 25 CPU
19, 29 Bus
20 Maintenance tool
22 Communication interface
23 Input device
24 Display device
100 Edge system 101-104 Unique ID
110 Collector
111 Collection program
112 Flow control program
113 Communication program
114 Connection program
115 Processing program
120 Collection setting storage
130 Data flow setting storage
140 Flow controller
141 Flow control executor
142 Real-time data manager
143 Non-real-time data manager
144 Load monitor
150 Registerer
160, 410 Data processor
170 Gateway communicator
171 Gateway communication executor
172, 430 Execution state monitor
180 Gateway connector
211 Maintenance program
401, 402 (400) Cloud server
420 Data processing execution controller
601, 602 (600) FA equipment
701, 702 Network
1400 Data store

The invention claimed is:

1. A data processing device for transferring data to an external service for coordination between a data processing system and the external service, the data processing device comprising:
a flow controller to control dataflow that is a flow of data processing in the data processing system of data collected from equipment;
a gateway communicator to communicate with the external service in compliance with a specification of an external interface that is publicly-released and defined with respect to receiving and sending of data from and to the external service, the external interface including a first external interface and a second external interface; and
a gateway connector to connect the flow controller and the gateway communicator to enable communication between the gateway communicator and the flow controller, wherein
the gateway communicator includes a first gateway communicator to communicate with a first external service as the external service, and a second gateway communicator to communicate with a second external service as the external service different from the first external service,
the first gateway communicator communicates with the first external service in compliance with a first specification of the first external interface that is publicly-released,
the second gateway communicator communicates with the second external service in compliance with a second specification of the second external interface, different from the first specification of the first external specification, that is publicly-released,
the first gateway communicator and the second gateway communicator communicate with the gateway connector in compliance with a third specification of an internal interface, different from the first specification of the first external interface and the second specification of the second external interface, that is publicly-released and defined with respect to receiving and sending of data in the data processing system, and
the gateway connector is able to identify the first gateway communicator and the second gateway communicator by identification information assigned by the flow controller.

2. The data processing device according to claim 1, further comprising:
a dataflow setting storage to store a dataflow setting that defines a flow of the data processing, wherein
the flow controller activates the gateway connector based on the dataflow setting.

3. The data processing device according to claim 1, wherein
the flow controller generates data storage corresponding to each gateway connector, and
the flow controller and the gateway communicator perform receiving and sending of data via the data storage.

4. The data processing device according to claim 1, further comprising a collector to collect data from the equipment.

5. The data processing device according to claim 1, further comprising a data processor to perform preset data processing on data collected from the equipment.

6. The data processing device according to claim 1, wherein the external service is a cloud computing service.

7. The data processing device according to claim 3, wherein
the flow controller stores, in the data storage, data destined for the external service,
the gateway communicator queries, at set intervals, the gateway connector about whether or not there is data to be sent to a server that provides the external service,
upon querying about presence/absence of data by the gateway communicator, the gateway connector confirms whether or not there is data in the data storage corresponding to the gateway communicator and notifies the gateway communicator of the presence/absence of data, and
in a case where there is data, the gateway communicator reads the data from the data storage and transfers the read data to the server that provides the external service.

8. The data processing device according to claim 3, wherein
the flow controller comprises:
a real-time data manager to manage real-time data that is data generated in real time in the data processing system, and
a non-real-time data manager to manage non-real-time data that includes connection information for connection to a server that provides the external service,
the non-real-time data manager provides the non-real-time data to the gateway communicator by storing the non-real-time data in the data storage, and
the real-time data manager provides the real-time data to the gateway communicator by storing the real-time data in the data storage.

9. A data processing system for coordinating with an external service, the data processing system comprising:
a data collector to collect data from equipment;
a flow controller to control dataflow in the data processing system of the data collected by the data collector;
a data processor to perform preset data processing on the data collected by the data collector;
a gateway communicator to communicate with the external service in compliance with a specification of an external interface that is publicly-released and defined with respect to receiving and sending of data from and to the external service, the external interface including a first external interface and a second external interface; and a gateway connector to connect the flow controller and the gateway communicator to enable communication between the gateway communicator and the flow controller, wherein the gateway communicator includes a first gateway communicator to communicate with a first external service as the external service, and a second gateway communicator to communicate with a second external service as the external service different from the first external service, the first gateway communicator communicates with the first external service in compliance with a first specification of the first external interface that is publicly-released, the second gateway communicator communicates with the second external service in compliance with a second specification of the second external interface, different from the first specification of the first external interface, that is publicly-released, the first gateway communicator and the second gateway communicator communicate with the gateway connector in compliance with a third specification of an internal interface, different from the first specification of the first external interface and the second specification of the second external interface, that is publicly-released and defined with respect to receiving and sending of data in the data processing system, and the gateway connector is able to identify the first gateway communicator and the second gateway communicator by identification information assigned by the flow controller.

* * * * *